Dec. 23, 1930.  C. W. CARR ET AL  1,785,728
SPLINING MACHINE
Filed April 16, 1928    4 Sheets-Sheet 1

INVENTORS
CHARLES W. CARR
ELWOOD I. TRIPP
BY Charles S. Evans
THEIR ATTORNEY.

Dec. 23, 1930.  C. W. CARR ET AL  1,785,728
SPLINING MACHINE
Filed April 16, 1928  4 Sheets-Sheet 2
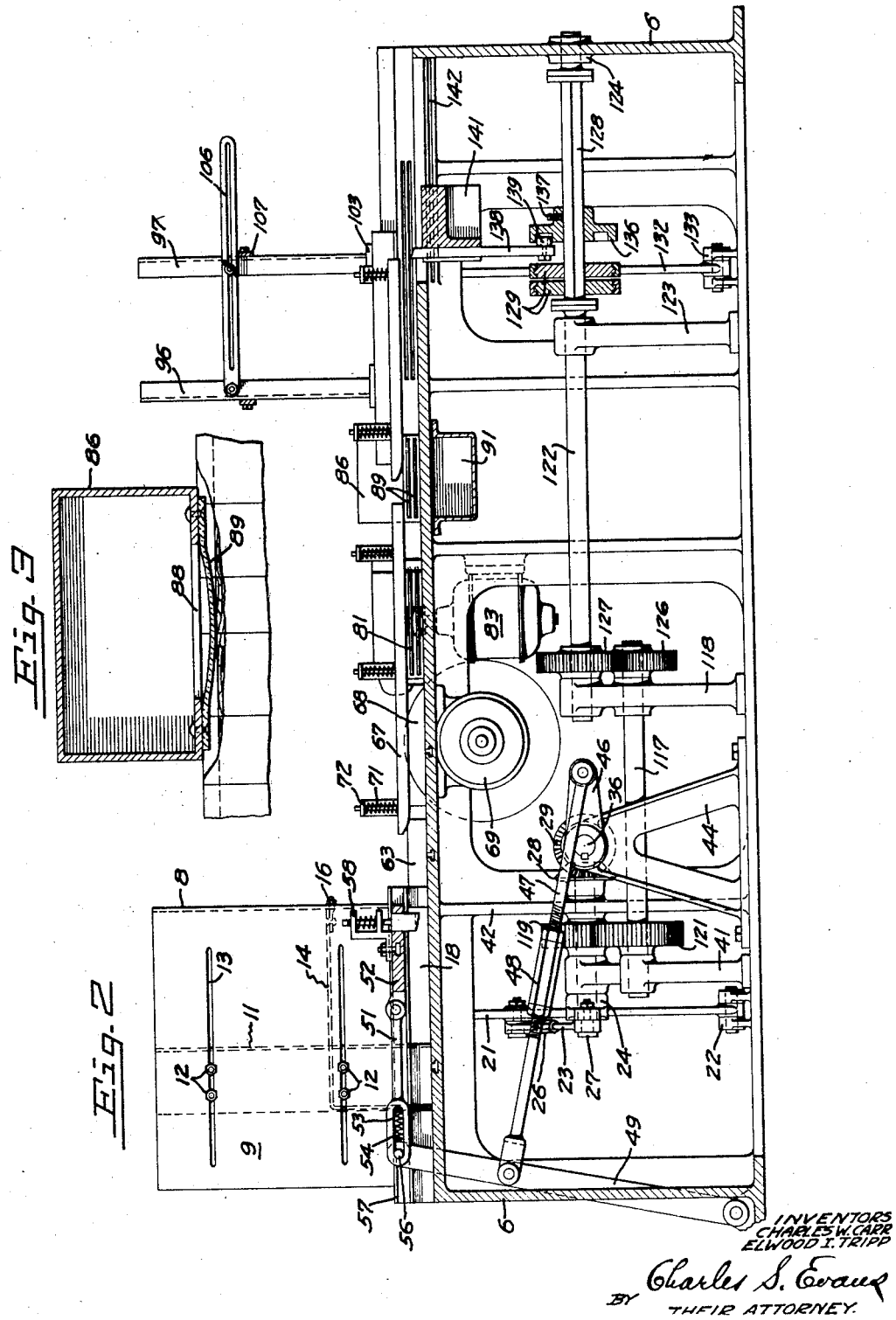
INVENTORS
CHARLES W. CARR
ELWOOD I. TRIPP
BY Charles S. Evans
THEIR ATTORNEY.

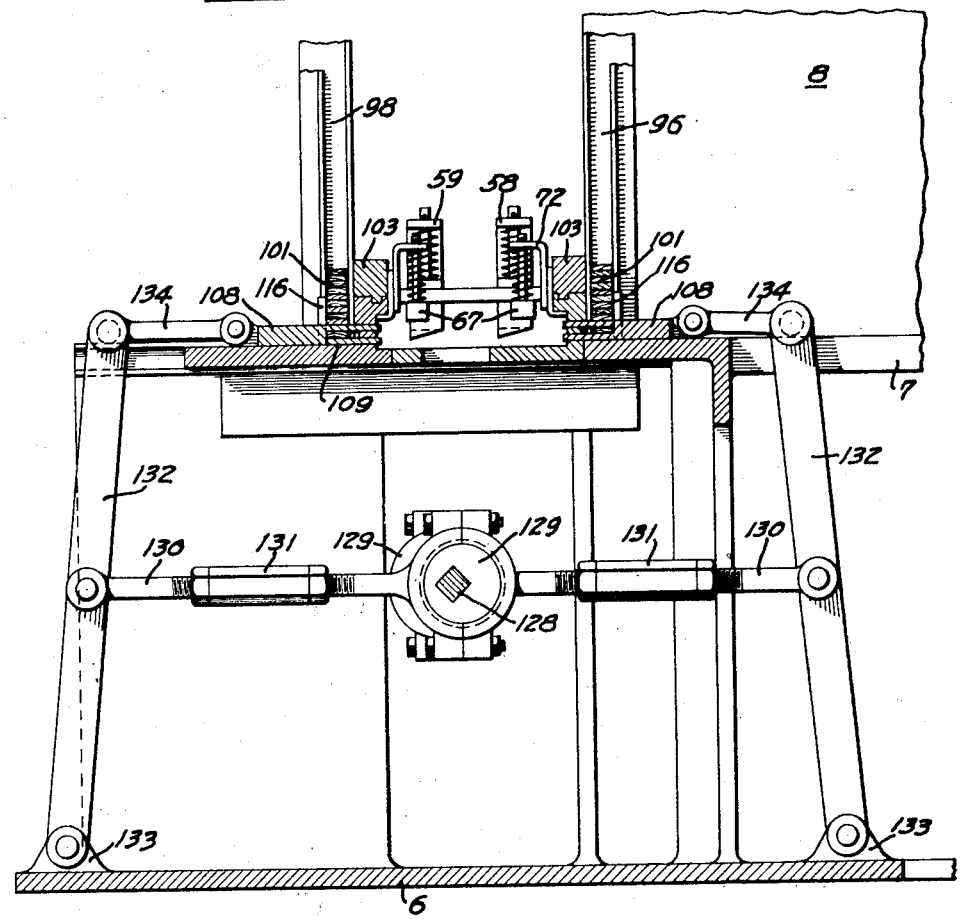

Patented Dec. 23, 1930

1,785,728

UNITED STATES PATENT OFFICE

CHARLES W. CARR AND ELWOOD I. TRIPP, OF SUSANVILLE, CALIFORNIA, ASSIGNORS OF ONE-FOURTH TO FRANK B. HUTCHENS, OF SAN FRANCISCO, CALIFORNIA, AND ONE-FOURTH TO EARL B. BIRMINGHAM, OF SUSANVILLE, CALIFORNIA

SPLINING MACHINE

Application filed April 16, 1928. Serial No. 270,453.

Our invention relates to machines for joining boards by means of splines or strips running transversely thereof and set in grooves in the ends of the boards, and particularly to machines for automatically producing box shooks joined in this manner.

An object of our invention is to produce a machine which will occupy a much smaller floor space than those previously used.

Another object of our invention is to produce a machine which will insert a plurality of splines simultaneously.

Still another object of our invention is to produce a machine which is not liable to jam, and in which discontinuities of operation due to shut-downs from this cause are reduced to a minimum.

A further object of our invention is to produce a machine which will apply a uniform coating of glue or other adhesive to the spline groove practically without wastage.

Our invention possesses other objects and valuable features, some of which will be set forth in the following description of our invention which is illustrated in the drawings forming part of the specification. It is to be understood that we do not limit ourselves to the showing made by the said description and drawings, as we may adopt varying forms of our invention within the scope of the claims.

Referring to the drawings:

Fig. 2 is a view in longitudinal vertical section, the plane of section being the line 2—2 of Fig. 1.

Fig. 3 is a view on an enlarged scale, showing a horizontal section of our gluing means.

Fig. 5 is a transverse sectional view taken on the line 5—5 of Fig. 1.

Figure 1:
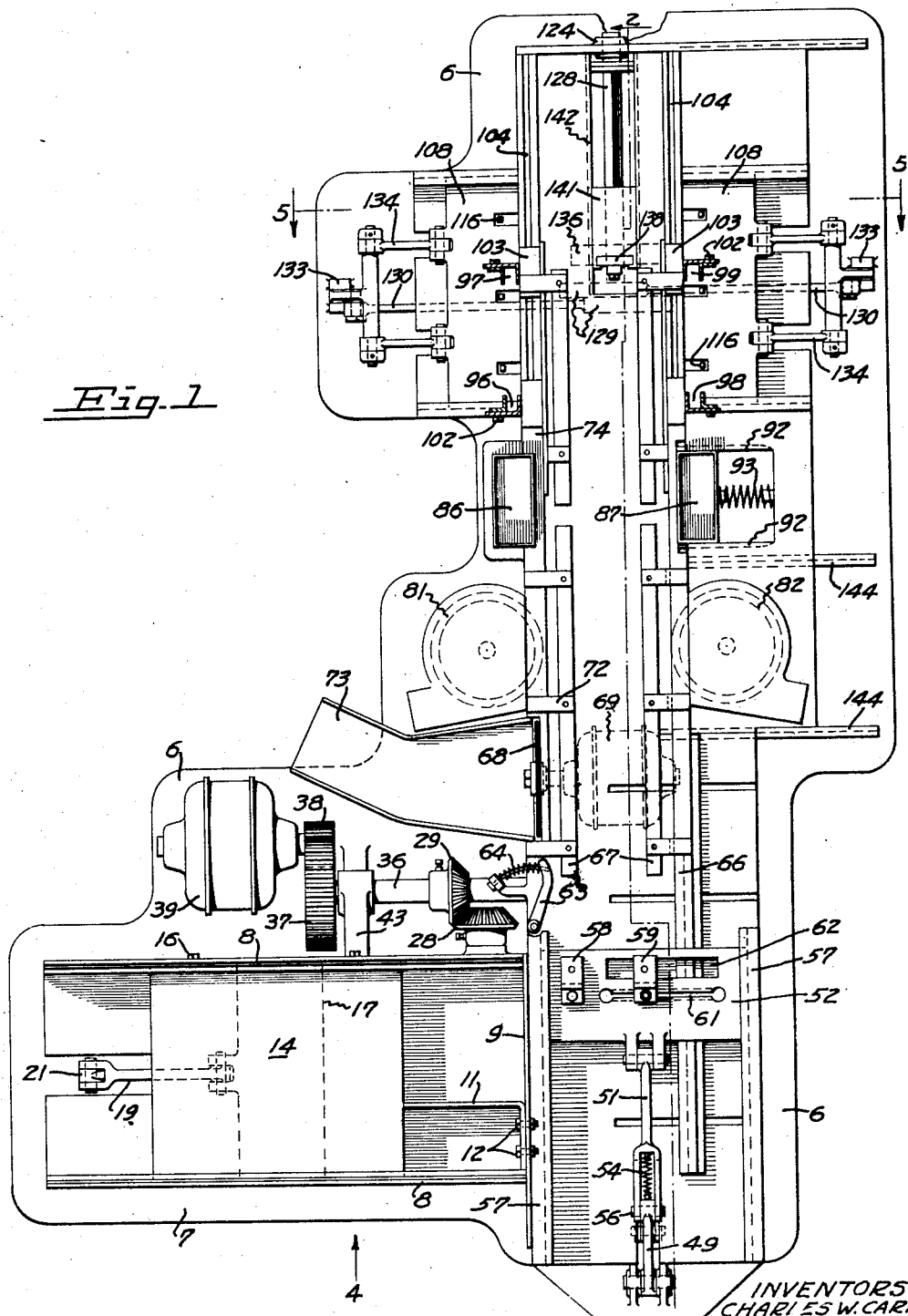
Fig. 1 is a plan view of a machine embodying our invention.
Figure 4:
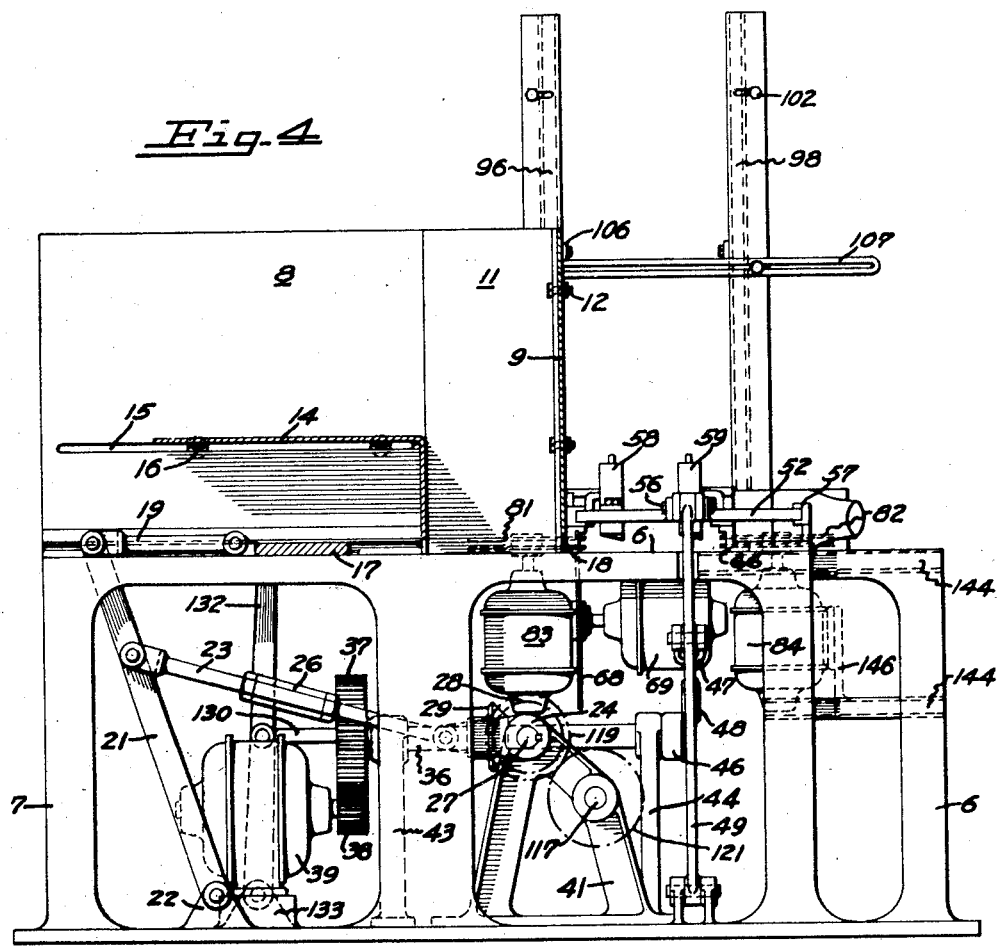
Fig. 4 is an elevation taken in the direction of the arrow 4 of Fig. 1. The stock hopper is shown in section in this figure, more clearly to disclose the construction.

Splining machines are not new. In general, however the shooks to be splined have been fed either singly or in groups of the required size by dogs carried by a chain conveyor. The conveyor bore the shooks past heads which formed grooves in their ends, and then past hoppers from which the splines were fed. A suitable mechanism glued one side of the spline before it left the hopper, and a part of this glue was transferred by contact to the opposite face of the succeeding spline. The shooks are made in double thickness and are re-sawed after splining. The machines inserted but one pair of splines at a time, and therefore almost a complete duplicate equipment was necessary to insert the second pair of splines.

As the glue was applied to the splines, in the course of feeding them to the grooves they frequently adhered to each other quite strongly. The result of this was that the feeding mechanism frequently jammed, and the resulting shut-downs reduced the output of these machines by from 30% to 50%. In many instances this reduction of output represented the margin of profit, and made it impossible for the splined shooks to compete with the ordinary solid shook. Experience has shown that our machine is capable of sustained operation at from 90% to 95% of its theoretical capacity, giving an assured margin of profit, and making it possible to utilize economically for this purpose what would otherwise be waste material.

In broadly inclusive terms, our invention comprises a table or frame on which are mounted the various elements of our device. At one end of the table is a hopper for containing the shooks to be splined and means are provided for feeding these shooks onto the table. A reciprocating slide pushes the splines thus fed along the table. A saw is provided for trimming them to exact length, and guides for holding them in alinement. Each shook lies transverse to its direction of travel, and is pushed forward by the one behind it, thus forming an uninterrupted succession of shooks. The shooks pass between a pair of groover heads, which form two or more parallel grooves in their ends. The spacing between these grooves is an integral multiple of their width. The shooks then pass gluepots from which the glue or other adhesive is flowed into the grooves, wastage being prevented by the close contiguity of the shooks.

The shooks next pass between spline hoppers, which feed the spline vertically downward by their own weight into position in front of the grooves. A hammer having a divided head then drives the splines into place, the lowest spline in the hopper entering the bottom groove, the next spline or splines serving as a spacer and the third or next registering spline entering the second groove.

If more than two grooves are used alternate splines serve as spacers and non-successive splines are driven into the grooves. The hammers on each side act simultaneously, and are timed to act when the reciprocating feed slide has reached its forward limit of travel. A reciprocating stop on the table, working in unison with the feed slide, checks the advance of the shooks just before the hammers strike, so that the shooks are tightly pressed together at that instant.

The entire machine is adjustable to take various sizes of raw stock and to turn out various widths, lengths and thicknesses of completed shooks.

In more detailed terms, a preferred embodiment of our invention comprises a base-frame or table 6 having at the input end a side extension 7 on which is mounted the stock hopper. The side walls 8 and front wall 9 of the hopper are fixed, but within the hopper is an auxiliary wall 11 which is adjustable by means of the bolts 12 passing thru slots 13 in the wall 9. The position of the auxiliary wall is determined by the width of the shook to be produced. Also adjustable within the hopper is the stock table 14 which slides in the slot 15 in the walls, the table being set in accordance with the length of the desired shook and clamped by the lock-bolts 16.

Beneath the stock table and top of the frame-extension 7 works the cross-feed slide 17. The function of this slide is to force the stock from the hopper thru the slot 18 and onto the table 6. A reciprocating motion is imparted to the slide by a link 19 pivotally mounted at its rear edge. The link in turn is pivoted to an arm 21 which rocks on a bearing 22 on the floor of the frame 6, and is driven by a connecting-rod 23 from the crank 24. A turnbuckle 26 is provided for adjusting the length of the connecting rod.

The crank 24 is mounted on the end of a shaft 27. The other end of this shaft carries a miter gear 28, meshing with the gear 29 on a shaft 36, driven preferably by the spur gears 37 and 38 from the motor 39. Shafts 27 and 36 are journaled in bearing brackets 41, 42, 43 and 44 secured to the base-frame 6.

The shaft 36 carries a crank 46, which drives a connecting rod 47, adjustable by a turnbuckle 48, arm 49, link 51 and slide 52 similar in general to the cross-feed mechanism. The link 51 however is connected to the arm 49 by a resilient joint comprising a slot 53 and spring 54 working against the pin 56.

The slide 52 works in ways 57, and constitutes the main feed of the machine, driving the stock forward by means of spring dogs 58 and 59. The dogs are beveled toward the back and side so as to override the stock on the back stroke and as it is fed from the side. The dog 58 is fixed, the dog 59 is laterally adjustable along the slots 61 and 62 to accommodate various lengths of stock.

Urged forward by the slide 52 the stock is forced past the finger 63 actuated by the spring 64, which presses the stock firmly against the guides 66. It next enters beneath the pressure heads 67 which hold it tightly against the table 6 as it is trimmed to accurate length by the saw 68 driven by the motor 69. The pressure heads are actuated by the springs 71 working against the supporting brackets 72. The trimmings from the ends of the stock pass down the chute 73.

From this point on the stock is held in alinement by the guide 74 co-acting with the guide 66. The groover heads 81 and 82, driven by motors 83 and 84, form the grooves or splineways in the ends of the stock, which is next pushed past the gluepots 86 and 87.

The gluepots comprise preferably rectangular cans, each mounted with one face in register with the guides 66 and 74 respectively. These faces are provided with slots 88, equal in width and positioned in alinement with the splineways. On each side of the slot is fastened the tongue 89, which is preferably of flexible material arched over the slot as shown in Fig. 3. The tongue enters, and laterally fills the groove forming with the walls of the groove a reservoir which is completely filled by the adhesive. The upper and lower walls of this reservoir, formed by the groove, move past the tongue, which retains most of the adhesive within its loop, but allows an adhering film to remain on the walls of the groove. As each piece of stock is pressed forward by the one behind it, there is no intervening gap thru which the glue can escape, and the wastage is very small. This slight wastage is caught and retained by the trough 91. In order still further to reduce the liability of wastage the gluepot 87 is slidably mounted on the ways 92, the spring 93 pressing it into intimate contact with the shooks, and these, in turn, with the gluepot 86.

The stock now moves to a position in register with the spline hoppers. The spline hoppers comprise vertical channels 96, 97 and 98, 99 each pair of which holds a column of splines 101. The hoppers are adjustable to various widths of splines by means of the bolts 102. The channels themselves are mounted on blocks 103, which are adjustable along the grooves 104 in the tops of the guides 66 and 74. Stay bars 106 and 107 give rigidity to the hoppers.

The splines are driven from the hoppers into the splineways by the hammers 108. The hammers have double driving heads which work thru passages 109 extending thru the side walls of the hoppers and the guides 66 and 74. As the splines lie in the hoppers the hammer heads strike the first and third splines, driving them into the corresponding grooves. The hammer heads are slotted to pass the pins 116, which retain the intermediate splines in the hopper as the hammers return preparatory to the next blow. Because the space between the spline grooves is equal to the width of the splines the second spline in each hopper holds the third in proper position to be driven into the upper groove, itself falling into place to be driven into the lower groove in the next shook upon the withdrawal of the hammer.

The hammers are driven from the motor 39 and are timed with the feed slides. A shaft 117 is journaled in the brackets 41 and 118 and driven by the spur gears 119 and 121 from the shaft 27. Another shaft 122, journaled in the brackets 118, 123 and 124 is driven from the shaft 117 thru the spur gears 126 and 127. Shaft 122 has a squared portion 128 which carries the opposed eccentrics 129. The eccentric rods 130, adjustable by turnbuckles 131 reciprocate the arms 132 which rock on the hinge joints 133 on the bottom of the base frame. The arms drive the hammers by the pivotally connected links 134.

The squared shaft 128 also carries a cam 136 whose position is adjustable along the shaft and which is locked by the set screw 137. The cam operates the reciprocating stop 138, which it engages by means of the roller 139. The stop works vertically in the guideblock 141, which is adjustable longitudinally of the frame in the slots 142. The stop is timed with the main feed, to rise as the latter is approaching the end of its forward stroke. It checks the glued shooks in front of the hammers, and as the main-feed slide continues slightly to advance, the spring 54 takes up the motion, and the stock is held tightly compressed at the instant the splines are being driven home. The stop then withdraws below the surface of the table and at the next forward stroke of the main-feed slide the completed shook is discharged from the end of the machine.

Besides the adjustments of hoppers, feed slides and stop, which allow the machine to be set for shooks of different length, different widths of shook can also be accommodated. T-slots 143 are provided in the table in which the guide 66 can be set at any desired point for this purpose. When the guide 66 is moved it carries with it the gluepot 87 and the spline hopper 98—99. Ways 144 are provided for the bracket 146 on which the motor 84 is mounted, thus providing for lateral adjustment of the groover head 82. The position of the hammers is adjusted by the turnbuckles 131 to correspond with the setting of the guide 66.

I claim:

1. A device for applying a fluid in a groove, comprising a reservoir for the fluid, having a slot in register with the groove, a strip arched over said slot and adapted to enter the groove, and means for feeding a grooved article past the slot.

2. In a splining machine; means for feeding an uninterrupted succession of shooks thru the machine, means for grooving the ends of the shooks, an adhesive reservoir having a slot in register with the groove, and a strip arched over said slot and adapted to enter the groove.

3. In a splining machine; means for feeding an uninterrupted succession of shooks thru the machine, means for forming a plurality of spaced grooves in one end of the shooks, means for applying an adhesive in the grooves, a hopper for feeding a succession of splines in front of said grooves, and means for forcing non-successive splines from said hopper into said grooves.

4. In a splining machine; means for feeding an uninterrupted succession of shooks thru the machine, means for forming a plurality of spaced grooves in one end of the shooks, means for applying an adhesive in the grooves, a hopper for feeding a succession of splines in front of said grooves, means for forcing non-successive splines from said hopper into said grooves, and means for retaining an intermediate spline within the hopper.

5. In a splining machine; means for feeding an uninterrupted succession of shooks thru the machine, means for forming a plurality of spaced grooves in one end of the shooks, means for applying an adhesive in the grooves, a hopper for feeding a succession of splines in front of said grooves, and a hammer having a divided head for driving non-successive splines into said grooves.

6. In a splining machine; means for feeding an uninterrupted succession of shooks thru the machine, means for forming a pair of grooves in one end of the shook, the spacing of said grooves being equal to their width, means for applying an adhesive in the grooves, a hopper for delivering a succession of splines in front of said grooves, and means for forcing non-successive splines into said grooves.

7. A method of applying an adhesive in a groove which comprises forming a reservoir whose walls comprise an arched strip entering the groove and a portion of the walls of the groove, flowing adhesive into said reservoir, and moving the groove and strip relatively to each other so that all portions of the side walls of the groove successively comprise the reservoir walls.

8. A method of applying an adhesive in a groove which comprises forming a reservoir whose walls comprise a tongue entering the groove and a portion of the walls of the groove, flowing adhesive into said reservoir, and moving the groove and strip relatively to each other so that all portions of the side walls of the groove successively comprise the reservoir walls.

9. A device for applying a fluid in a groove comprising a reservoir for the fluid having a slot in register with the groove, means for moving the grooved articles past the slot, and means adjacent the slot for preventing the contact of the fluid with the back of the groove.

10. The method of simultaneously feeding two splines into complementary grooves which consists in forming a stack of the splines, passing the grooved articles past said stack, and simultaneously displacing non-successive splines from the stack into the grooves.

11. The process of inserting a plurality of splines into the edge of a shook which comprises forming grooves in the shook separated by a space which is an integral multiple of the spline thickness, forming the splines into a stack, moving the shook into proximity with the stack, and simultaneously displacing non-successive splines from the stack into the grooves.

In testimony whereof, we have hereunto set our hands.

CHARLES W. CARR.
ELWOOD I. TRIPP.